United States Patent [19]

Kielhorn-Bayer et al.

[11] Patent Number: 5,310,822
[45] Date of Patent: May 10, 1994

[54] IMPACT-RESISTANT POLYOXYMETHYLENE MOLDING MATERIALS

[75] Inventors: Sabine Kielhorn-Bayer, Maxdorf; Peter Groll, Dannstadt-Schauernheim, both of Fed. Rep. of Germany

[73] Assignee: BASF Aktiengesellschaft, Ludwigshafen, Fed. Rep. of Germany

[21] Appl. No.: 126,884

[22] Filed: Sep. 27, 1993

[30] Foreign Application Priority Data

Sep. 28, 1992 [DE] Fed. Rep. of Germany ....... 4232416

[51] Int. Cl.$^5$ .................. C08K 7/14; C08L 77/00; C08L 75/08; C08L 71/00
[52] U.S. Cl. ............................ 525/399; 524/494; 524/400; 524/413
[58] Field of Search ................ 524/399, 494; 525/400, 525/413

[56] References Cited

U.S. PATENT DOCUMENTS

| | | | |
|---|---|---|---|
| 4,217,437 | 8/1980 | Schreckenberg et al. | 528/171 |
| 5,137,935 | 8/1992 | Bott et al. | 525/467 |

FOREIGN PATENT DOCUMENTS

| | | |
|---|---|---|
| 117664 | 9/1984 | European Pat. Off. |
| 116456 | 5/1988 | European Pat. Off. |
| 358555 | 3/1990 | European Pat. Off. |
| 2726416 | 12/1978 | Fed. Rep. of Germany |

*Primary Examiner*—Veronica P. Hoke
*Attorney, Agent, or Firm*—Keil & Weinkauf

[57] ABSTRACT

Thermoplastic molding materials contain
  A) from 10 to 97% by weight of a polyoxymethylene homo- or copolymer,
  B) from 3 to 50% by weight of a thermoplastic elastomer selected from the group consisting of the thermoplastic polyurethanes, the polyetheresters and the polyetheramides, the flexible phase of which is derived from polyetherpolycarbonatediols,
  C) from 0 to 50% by weight of a fibrous or particulate filler or a mixture thereof and
  D) from 0 to 30% by weight of conventional additives or processing assistants.

5 Claims, No Drawings

IMPACT-RESISTANT POLYOXYMETHYLENE MOLDING MATERIALS

The present invention relates to thermoplastic molding materials containing
  A) from 10 to 97% by weight of a polyoxymethylene homo- or copolymer,
  B) from 3 to 50% by weight of a thermoplastic elastomer selected from the group consisting of the thermoplastic polyurethanes, the polyetheresters and the polyetheramides, the flexible phase of which is derived from polyetherpolycarbonatediols, and
  C) from 0 to 50% by weight of a fibrous or particulate filler or a mixture thereof or
  D) from 0 to 30% by weight of conventional additives or processing assistants.

The present invention furthermore relates to the use of such molding materials for the production of moldings of any type and to the moldings thus obtained.

Polyoxymethylene homo- or copolymers have long been known. The polymers have a number of excellent properties and are therefore suitable for a very wide range of industrial applications. Nevertheless, there has been no lack of attempts to find agents for improving the impact strength, in particular the multiaxial impact strength. Apart from the magnitude of the toughness values, the fracture properties of the damaged parts is also critical for certain applications.

Thus, especially in the automotive sector, it is a requirement that a ductile fracture occurs at up to $-40°$ C., ie. the deformation of the molding should be very large, in particular at low temperatures, before the fracture occurs.

EP-A-117 664 and EP-A-116 456 disclose, for example, thermoplastic polyurethanes as impact modifiers for polyoxymethylene. The components of the thermoplastic polyurethanes are polyetherpolyols or polyesterpolyols, polyol components based on polyoxytetramethylenediols also being mentioned. However, the polycarbonatediols contain no further comonomers and have conventional average molecular weights.

The preparation of polycarbonatediols and their use for the preparation of thermoplastic polyurethanes are described, inter alia, in EP-A-358 555, DE-A-27 26 416 and EP-A-442 402, polyoxymethylene molding materials not being mentioned.

However, known polyoxymethylene molding materials have the disadvantages that they either have good oxidation stability and good oil swelling behavior (dimensional stability) but little resistance to hydrolysis or good hydrolysis stability but poor oxidation stability and dimension stability. Furthermore, the fuel resistance and mechanical properties are worthy of improvement to enable the moldings to be used for a very long time in the various applications.

It is an object of the present invention to provide polyoxymethylene molding materials which do not have the stated disadvantages.

We have found that this object is achieved by the thermoplastic molding materials defined at the outset, wherein the polyetherpolycarbonatediols which form the flexible phase of the thermoplastic elastomer B) are essentially composed of:
  $b_1$) from 3 to 63.7 mol % of units which are derived from a polyoxytetramethylenediol,
  $b_2$) from 63.7 to 3 mol % of units which are derived from a polyoxyalkylenediol differing from $b_1$) and having $C_2$–$C_8$-alkylene groups, an aliphatic alkanediol of 2 to 14 carbon atoms, an alicyclic alkanediol of 3 to 14 carbon atoms or an alkylene oxide of 2 or 3 carbon atoms or a mixture thereof, and
  $b_3$) from 33.3 to 50 mol % of units which are derived from phosgene, a dialkyl carbonate having $C_1$–$C_4$-alkyl groups or a cyclic carbonate having $C_2$–$C_4$-alkylene bridges or a mixture thereof.

Preferred materials of this type are described in the subclaims.

The novel molding materials contain, as component A), from 10 to 97, preferably from 40 to 95, in particular from 60 to 90, % by weight of a polyoxymethylene homo- or copolymer.

Such polymers are known per se to the person skilled in the art and are described in the literature.

Very generally, these polymers contain at least 50 mol % of repeating units —$CH_2O$— in the polymer main chain.

The homopolymers are generally prepared by polymerizing formaldehyde or trioxane, preferably in the presence of suitable catalysts.

For the purposes of the present invention, polyoxymethylene copolymers are preferred as component A, in particular those which, in addition to the repeating units —$CH_2O$—, also contain up to 50, preferably from 0.1 to 20, in particular from 0.3 to 10, mol % of repeating units

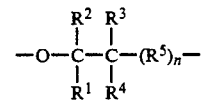

where $R^1$ to $R^4$ independently of one another are each hydrogen, $C_1$–$C_4$-alkyl or halogen-substituted alkyl of 1 to 4 carbon atoms, $R^5$ is —$CH_2$—, —$CH_2O$— or $C_1$–$C_4$-alkyl-substituted or $C_1$–$C_4$-haloalkyl-substituted methylene or a corresponding oxymethylene group and n is from 0 to 3. Advantageously, these groups can be introduced into the copolymers by ring cleavage of cyclic ethers. Preferred cyclic ethers are those of the formula

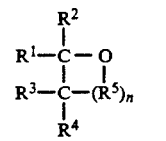

where $R^1$ to $R^5$ and n have the abovementioned meanings. Merely by way of example, ethylene oxide, 1,2-propylene oxide, 1,2-butylene oxide, 1,3-butylene oxide, 1,3-dioxane, 1,3-dioxolane and 1,3-dioxepan may be mentioned as cyclic ethers, and linear oligoformals or polyformals, such as polydioxolane or polydioxepan may be mentioned as comonomers.

Other suitable components A) are oxymethylene terpolymers which are prepared, for example, by reacting trioxane and one of the cyclic ethers described above with a third monomer, preferably a bifunctional compound of the formula

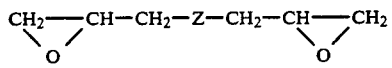

where Z is a chemical bond, —O—, —ORO— and R is $C_1$–$C_8$alkylene or $C_2$–$C_8$-cycloalkylene.

Preferred monomers of this type are ethylene diglycide, diglycidyl ether and diethers of glycidyl compounds and formaldehyde, dioxane or trioxane in a molar ratio of 2:1, as well as diethers of 2 mol of a glycidyl compound and 1 mol of an aliphatic diol of 2 to 8 carbon atoms, for example the diglycidyl ethers of ethylene glycol, 1,4-butanediol, 1,3-butanediol, cyclobutane-1,3-diol, 1,2-propanediol and cyclohexane-1,4-diol, to mention but a few examples.

Processes for the preparation of the homo- and copolymers described above are known to the person skilled in the art and are described in the literature, so that no further information is required here. The preferred polyoxymethylene copolymers have melting points of at least 150° C. and weight average molecular weights $M_w$ of from 5,000 to 200,000, preferably from 7,000 to 150,000.

Polyoxymethylene polymers which are stabilized at the terminal groups and which have C—C bonds at the chain ends are particularly preferred.

The novel molding materials contain, as component B), from 3 to 50, preferably from 5 to 40, in particular from 10 to 25, % by weight of a thermoplastic elastomer selected from the group consisting of the thermoplastic polyurethanes, the polyetheresters and the polyetheramides, the flexible phase of which is derived from polyetherpolycarbonatediols, wherein the polyetherpolycarbonatediols which form the flexible phase of the thermoplastic elastomer B) are essentially composed of:

b$_1$) from 3 to 63.7 mol % of units which are derived from a polyoxytetramethylenediol, b$_2$) from 63.7 to 3 mol % of units which are derived from a polyoxyalkylenediol differing from A) and containing $C_2$–$C_8$-alkylene groups, an aliphatic alkanediol of 2 to 14 carbon atoms, an alicyclic alkanediol of 3 to 14 carbon atoms or an alkylene oxide of 2 or 3 carbon atoms or a mixture thereof, and b$_3$) from 33.3 to 50 mol % of units which are derived from phosgene, a dialkyl carbonate having $C_1$–$C_4$-alkyl groups or a cyclic carbonate having $C_2$–$C_4$-alkylene bridges or a mixture thereof.

The polyoxytetramethylenediols used as component b$_1$) (also referred to as polytetrahydrofurans or polyoxytetramethylene ether glycols) can be prepared according to known methods by catalytic polymerization of tetrahydrofuran. They generally have a number average molecular weight $M_n$ of from 150 to 5,000, preferably from 150 to 2,900, in particular from 150 to 450.

The amount of the units which are derived from the component A) is from 3 to 63.7, preferably from 20 to 50, mol %.

Polyoxyalkylenediols different from b$_1$) and having $C_2$–$C_8$-alkylene groups, in particular $C_2$–$C_4$-alkylene groups, have proven suitable as component b$_2$). Polyoxytetramethylenediols which have a number average molecular weight $M_n$ differing from that of component b$_1$) are preferred. Linear and branched alkanediols of 2 to 14 carbon atoms, in particular ethanediol, 1,3-propanediol, 1,2-propanediol, 1,4-butanediol, 1,3-butanediol, 1,5-pentanediol, 1,6-hexanediol, 1,7-heptanediol and, 8-octanediol, have proven particularly useful. Among the cycloaliphatic diols of 3 to 14 carbon atoms, the unsubstituted and $C_1$–$C_4$-alkyl-substituted 5-membered and 6-membered rings are particularly suitable, dihydroxycyclohexane and 1,4-dihydroxymethylcyclohexane being preferred. Ethylene oxide and propylene oxide as well as mixtures of the compounds used as components b$_2$) may be employed.

The units which are derived from the component b$_2$) are used in the preparation of polyetherpolycarbonatediols in amounts of from 63.7 to 3, preferably from 50 to 20 mol %.

Preferred components b$_3$) are dialkyl carbonates having $C_1$–$C_4$-alkyl groups, in particular dimethyl carbonate, diethyl carbonate and dipropyl carbonate. Among the cyclic carbonates having $C_2$–$C_4$-alkylene bridges, ethylene carbonate, 1,2-propylene carbonate and 1,3-propylene carbonate are preferred. Phosgene as well as mixtures of compounds mentioned as component b$_3$) may also be used.

The polyetherpolycarbonatediols contain the units which are derived from the component b$_3$) in amounts of from 33.3 to 50, in particular from 40 to 50, mol %.

It should be pointed out that, depending on the type of carbonate used, the composition of the monomer mixture used does not always reflect the composition of the polyetherpolycarbonatediols. In some cases, there are losses of the carbonate used in the reaction, so that the latter must be used in larger amounts. In the case of phosgene, the excess depends on the amount of phosgene which is expelled with the hydrochloric acid formed and, in the particularly preferred case of dialkyl carbonates, on whether or not the carbonate used forms an azeotropic mixture with the alcohol formed in the esterification, the excess being from 0.5 to 50, preferably from 5 to 35, mol %.

The reaction of the components b$_1$) and b$_2$) with the component b$_3$) is preferably carried out in the presence of a catalyst.

The catalysts used may be the conventional transesterification catalysts, such as tetraisopropyl orthotitanate, dibutyltin oxide, dibutyltin dilaurate and zirconium(IV) acetylacetonate, as well as alkali metal alcoholates, for example sodium methylate, potassium methylate, sodium ethylate or potassium ethylate. The amount of catalyst is from 0.001 to 2%, preferably from 0.01 to 0.5%, based on the total amount of the starting materials.

The reaction components are preferably heated to the boil with the catalyst, and, when dialkyl carbonates are used, the corresponding alcohol formed or the azeotropic mixture of carbonate and alcohol can be separated off by distillation. The reaction generally takes place at from 20° to 250° C., preferably from 40° to 100° C. If phosgene is used, temperatures of from 0° to 100° C., preferably from 20° to 80° C., may be employed. In this case, a base, for example pyridine or triethylamine, is preferably added to the reaction mass to neutralize the hydrochloric acid formed.

When alkali metal alcoholates are used as the catalyst, a reaction temperature of from 20° to 150° C., in particular from 40° to 80° C., is preferred, the catalyst being separated off by neutralizing it with acid, such as phosphoric acid, and isolating the precipitated alkali metal salt of the relevant acid.

When tetraisopropyl orthotitanate is used as the catalyst, a reaction temperature of from 40° to 250° C., in particular from 100° to 200° C., is preferred, and the excess catalyst can be deactivated after the end of the reaction, for example by adding phosphoric acid.

The reaction can be carried out under atmospheric, reduced or superatmospheric pressure. Reduced pressure of from 0.1 to 5 mbar is usually applied at the end of the reaction in order to remove the final residues of low boilers. The reaction is complete when no further low boilers distill over.

The resulting polyethercarbonatediols have a number average molecular weight $M_n$ of from 200 to 12,000, in particular from 500 to 6,000, very particularly from 1,000 to 2,500.

The thermoplastic polyurethanes, the polyetheresters and the polyetheramides are prepared by conventional processes known per se to the person skilled in the art, polyetherpolycarbonatediols obtained by reacting a carbonate component with $b_1$) and $b_2$), as stated in the above description, being used as the diol component for the flexible phase. For further details, reference may be made to the relevant literature.

In the case of the thermoplastic polyurethanes, polyetherpolycarbonatediols are reacted with organic polyisocyanates and chain extenders in a known manner, it being possible to use both the one-shot procedure (ie. all three components are reacted simultaneously) and the prepolymer method (ie. a prepolymer of polyetherpolycarbonatediol and polyisocyanate is reacted with the chain extender).

Suitable polyisocyanates are all conventional polyisocyanates used for thermoplastic polyurethanes, such as diphenylmethane 4,4'-diisocyanate, tolylene 2,4-diisocyanate, tolylene 2,6-diisocyanate, naphthalene diisocyanate, hexamethylene diisocyanate, isophorone diisocyanate, 2-(3-isocyanatopropyl)-cyclohexyl isocyanate and diphenylmethane 4,4'-diisocyanate which is hydrogenated in the nucleus, as well as mixtures thereof.

The chain extenders used are likewise known and are usually used for the preparation of thermoplastic polyurethanes. Examples are diols, diamines, dithiols, mercaptoalcohols, amino alcohols and aminothiols having $C_2$-$C_9$-alkyl groups or mixtures thereof, in particular ethylene glycol, 1,3-propanediol, 1,4-butanediol, 1,5-pentanediol, 1,6-hexanediol, 1,7-heptanediol, 1,8-octanediol, 1,9-nonanediol, neopentylglycol, but-2-ene-1,4-diol, but-2-yne-1,4-diol, 2-butyl-2-ethyl-1,3-propanediol, 2-aminopropan-1-ol and 3-amino-2,2'-dimethylpropanol; diols, diamines and dithiols having $C_9$-$C_{14}$-cycloalkyl groups which may be substituted by $C_1$-$C_4$-alkyl groups, and mixtures thereof, may also be mentioned, preferably cyclohexanedimethanol, as well as aromatic and heterocyclic compounds, such as hydroquinone, resorcinol, p-cresol, p-aminophenol, 2,7-dihydroxynaphthalene, 4,4'-dihydroxybiphenyl and 4,5-bis(hydroxymethyl)-2-methylimidazole.

The conditions of the reaction of the polyisocyanates, polyethercarbonatediols and chain extenders are known; in general, the reaction is carried out at from 50° to 300° C.

Processes for the preparation of polyetheresters and polyetheramides are described, for example, in Chimica 28, 9 (1974), 544 et seq., and in J. Macromol. Sci. A1 (4) (1967), 617-625.

The novel molding materials may contain, as component C), from 0 to 50, preferably from 5 to 40, % by weight of a fibrous or particulate filler or of a mixture thereof.

Examples of reinforcing fillers are potassium titanate whiskers, carbon fibers and preferably glass fibers, where the glass fibers may be used, for example, in the form of glass fabrics, mats and surface mats and/or glass rovings or cut glass filaments of low-alkali E glass, having a diameter of from 5 to 200 μm, preferably from 8 to 50 μm, the fibrous fillers preferably having an average length of from 0.05 to 1 mm, in particular from 0.1 to 0.5 mm, after they have been incorporated.

Other suitable fillers are, for example, wollastonite, calcium carbonate, glass spheres, quartz powder, silicon nitride and boron nitride or mixtures of these fillers.

In addition to the components A) and B) and, if required, C), the novel molding materials may also contain conventional additives and processing assistants D) in amounts of up to 30, preferably up to 20, % by weight. Formaldehyde scavengers, plasticizers, lubricants, antioxidants, adhesion promoters, light stabilizers and pigments may be mentioned here merely as examples of additives. The amount of such additives is in general from 0.001 to 5% by weight.

In a preferred embodiment, the novel molding materials may contain a melamine/formaldehyde condensate as a nucleating agent. Suitable products are described, for example, in DE 25 40 207.

Corresponding compounds are known to the person skilled in the art and are described, for example, in EP-A 327 384.

The novel thermoplastic molding materials are prepared by mixing the components in a conventional manner, and detailed information is therefore unnecessary here. Mixing of the components is advantageously carried out in an extruder.

The novel thermoplastic molding materials have a balanced property spectrum, in particular good impact strength, especially good multiaxial impact strength, and good dimensional stability and fuel resistance.

Accordingly, they are suitable for the production of moldings of any type, applications as gasoline tank level sensors being particularly preferred.

EXAMPLES

Component A

Polyoxymethylene copolymer of 97.3% by weight of trioxane and 2.7% by weight of butanediolformal. The product also contained about 3% by weight of unconverted trioxane and 5% by weight of thermally unstable components. After degradation of the thermally unstable components, the copolymer had a melt flow index of 9 g/10 min (190° C./2.16 kg, according to DIN 53,735).

Component B

Preparation of the polyetherpolycarbonatediol 2,114 g (8.7 mol) of polyoxytetramethylenediol $b_1$) having an $M_n$ of 243, 87 g (0.97 mol) of 1,4-butanediol $b_2$) and 1,014 g (8.58 mol) of diethyl carbonate $b_3$) and 0.161 g (50 ppm) of tetraisopropyl orthotitanate were heated to the boil and the ethanol formed was distilled off continuously from the unconverted diethyl carbonate in a distillation column (25 cm packing height, packing: 5 mm stainless steel nets) under atmospheric pressure at a reflux ratio of 6:1. The reaction was carried out at 175° C. To remove the low boilers, a reduced pressure of 0.3 mbar (30 Pa) was applied.

Yield: 2,395 g
$M_n = 1968$

OH number=57

The determination of the OH number and of the number average molecular weight $M_n$ was carried out as follows:

The number average molecular weight $M_n$ was calculated from the OH number ($M_n = 112,200/\text{OH number}$). The OH number was determined by potentiometric titration by the PSA method.

Preparation of the thermoplastic polyurethane B 1,500 g of this polyetherpolycarbonatediol, in which the catalyst had been deactivated by adding phosphoric acid, were dried for one hour at 110° C. and 5 mbar, 187.5 g of 1,4-butanediol were added, the mixture was brought to 70° C. and a melt comprising 722.1 g of diphenylmethane 4,4'-diisocyanate and heated to 65° C. was added while stirring. After the reaction mixture had reached 120° C., it was poured onto a sheet which was at 125° C. Thereafter, the crude product was comminuted and was dried for 15 hours at 100° C. in a drying oven, and granules were prepared by means of a cutting mill.

The product had a Shore A hardness of 85 (measured according to DIN 53,505).

The following thermoplastic polyurethanes were used for comparison (according to EP-A-117 664 and EP-A116 456):

Component B/1V

A thermoplastic polyurethane composed of:
57.9% by weight of polyoxytetramethylenediol ($M_n$: 1,000)
7.3% by weight of 1,4-butanediol
34.8% by weight of diphenylmethane 4,4'-diisocyanate.

Component B/2V

A thermoplastic polyurethane composed of:
41.4% by weight of adipic acid
33.8% by weight of 1,4-butanediol
24.8% by weight of diphenylmethane 4,4'-diisocyanate
Shore A hardness: 85

Preparation of the polyoxymethylene molding materials

The component A) was mixed with component B) at 230° C. in a twin-screw extruder, homogenized and devolatilized, and the homogenized mixture was extruded through a die and granulated.

Test specimens were then produced on an injection molding machine at 200° C., conventional test panels being used for determining the impact strength and circular disks (diameter 60 mm, thickness 2 mm) being employed for determining the total penetration energy and dimensional stability.

The following measurements were carried out:
Notched impact strength $a_k$ according to DIN 53,453, hole impact strength $a_{kl}$ according to DIN 53,753, total penetration energy $W_{tot}$ according to DIN 53,443 and fuel resistance according to DIN 51604-B of the Technical Committee for Mineral and Fuel Standardization, at 50° C. and using a conventional test fuel (84.5% of unleaded premium-grade gasoline, 15% of methanol and 0.5% by weight of water).

The test specimens were stored over a period of 10 weeks, test specimens being removed every week, cooled at room temperature and dried.

The weight losses were calculated in % in relation to the initial samples (without storage), and the total penetration energy was determined. The values stated correspond to a mean value of 10 measurements. Composition of the molding materials:
80% by weight of A) and
20% by weight of the particular component B).

The results of the measurements are shown in the Tables.

TABLE 1

| Example | Component B [% by wt.] | $a_k$ [kJ/m²] 23° C. | $a_k$ [kJ/m²] −20° C. | $a_k$ [kJ/m²] −40° C. | $a_{kl}$ [kJ/m²] 23° C. | $a_{kl}$ [kJ/m²] −20° C. | $a_{kl}$ [kJ/m²] −40° C. |
|---|---|---|---|---|---|---|---|
| 1 | 20 B | 8 | 6 | 4 | 56 | 31 | 20 |
| 2* | 20 B/1V | 5 | 3 | 2 | 42 | 27 | 23 |
| 3* | 20 B/2V | 8 | 4 | 2 | 52 | 26 | 22 |

*For comparison

TABLE 2

| Method of measurement Example | W tot. [nm] 1 | W tot. [nm] 2* | W tot. [nm] 3* | Weight changes [%] 1 | Weight changes [%] 2* | Weight changes [%] 3* |
|---|---|---|---|---|---|---|
| 0 week | 51 | 26 | 43 | 0.0 | 0.0 | 0.0 |
| 1st week | 48 | 23 | 37 | 1.5 | 4.6 | 2.5 |
| 2nd week | 44 | 24 | 28 | 2.0 | 5.0 | 3.0 |
| 3rd week | 45 | 25 | 30 | 2.5 | 4.8 | 3.3 |
| 4th week | 45 | 27 | 28 | 2.3 | 4.7 | 3.4 |
| 5th week | 46 | 25 | 30 | 2.3 | 4.8 | 3.6 |
| 6th week | 45 | 24 | 30 | 2.7 | 4.6 | 3.8 |
| 7th week | 40 | 26 | 26 | 2.7 | 4.9 | 3.6 |
| 8th week | 39 | 26 | 28 | 1.9 | 4.2 | 3.1 |
| 9th week | 38 | 22 | 27 | 1.7 | 3.2 | 2.6 |
| 10th week | 31 | 22 | 16 | 1.4 | 1.7 | 1.1 |

The novel mixture 1 is comparable with or better than mixture 3* (having polyester as a flexible segment) with regard to the $a_k$, and $a_{kl}$ and multiaxial toughness prior to storage in gasoline. At −20° C. and −40° C., the $a_k$ values are actually up to about 100% higher. Compared with the polyether TPU 2*, the values for the novel mixture are more advantageous in every case.

The superiority of the novel mixture is evident on storage in gasoline. Particularly in comparison with the polyesterpolyurethane 3*, which has the same initial toughness, the toughness is retained in the case of the novel mixture whereas it decreases dramatically in the case of No. 3*. The toughness of the polyetherpolyurethane 2* is retained during storage in gasoline, as is also known from the property profile of the polyether TPUs, but is in general at a very much lower level.

In the case of the weight changes, the novel sample 1 performs the best, ie. it absorbs the smallest amount of gasoline and therefore shows the smallest weight increase. Toward the end of the storage times, the weights of all samples decrease again since the matrices begin to dissolve.. This process is most pronounced in the case of the comparative samples 2* and 3*. The novel sample 1, on the other hand, remains most constant.

We claim:
1. A thermoplastic molding material containing
   A) from 10 to 97% by weight of a polyoxymethylene homo- or copolymer,
   B) from 3 to 50% by weight of a thermoplastic elastomer selected from the group consisting of the thermoplastic polyurethanes, the polyetheresters and the polyetheramides, the flexible phase of which is derived from polyetherpolycarbonatediols,

C) from 0 to 50% by weight of a fibrous or particulate filler or a mixture thereof and D) from 0 to 30% by weight of processing assistants, wherein the polyetherpolycarbonatediols which form the flexible phase of the thermoplastic elastomer B) are essentially composed of:

$b_1$) from 3 to 63.7 mol % of units which are derived from a polyoxytetramethylenediol, $b_2$) from 63.7 to 3 mol % of units which are derived from a polyoxyalkylenediol differing from $b_1$) and having $C_2$–$C_8$-alkylene groups, an aliphatic alkanediol of 2 to 14 carbon atoms, an alicyclic alkanediol of 3 to 14 carbon atoms or an alkylene oxide of 2 or 3 carbon atoms or a mixture thereof, and $b_3$) from 33.3 to 50 mol % of units which are derived from phosgene, a dialkyl carbonate having $C_1$–$C_4$-alkyl groups or a cyclic carbonate having $C_2$–$C_4$-alkylene bridges or a mixture thereof.

2. A thermoplastic molding material as claimed in claim 1, wherein the component $b_2$) used is an aliphatic diol of 2 to 8 carbon atoms.

3. A thermoplastic molding material as claimed in claim 1, wherein the component $b_2$) used is a dialkyl carbonate having $C_1$–$C_3$-alkyl groups.

4. A thermoplastic molding material as claimed in claim 1, containing
   A) from 40 to 95% by weight
   B) from 5 to 40% by weight.

5. A molding obtainable from a thermoplastic molding material as claimed in claim 1.

* * * * *